Dec. 10, 1957    E. M. JOHNSON ET AL    2,815,565
REMOTE CONTROL FUZE REMOVING DEVICE
Filed Nov. 10, 1955    5 Sheets-Sheet 1

INVENTORS
REESE TRIPP
E. MELVIN JOHNSON
BY
ATTORNEYS

INVENTORS
REESE TRIPP
E. MELVIN JOHNSON
ATTORNEYS

Dec. 10, 1957  E. M. JOHNSON ET AL  2,815,565
REMOTE CONTROL FUZE REMOVING DEVICE
Filed Nov. 10, 1955  5 Sheets-Sheet 3

INVENTORS
REESE TRIPP
E. MELVIN JOHNSON
BY
ATTORNEYS

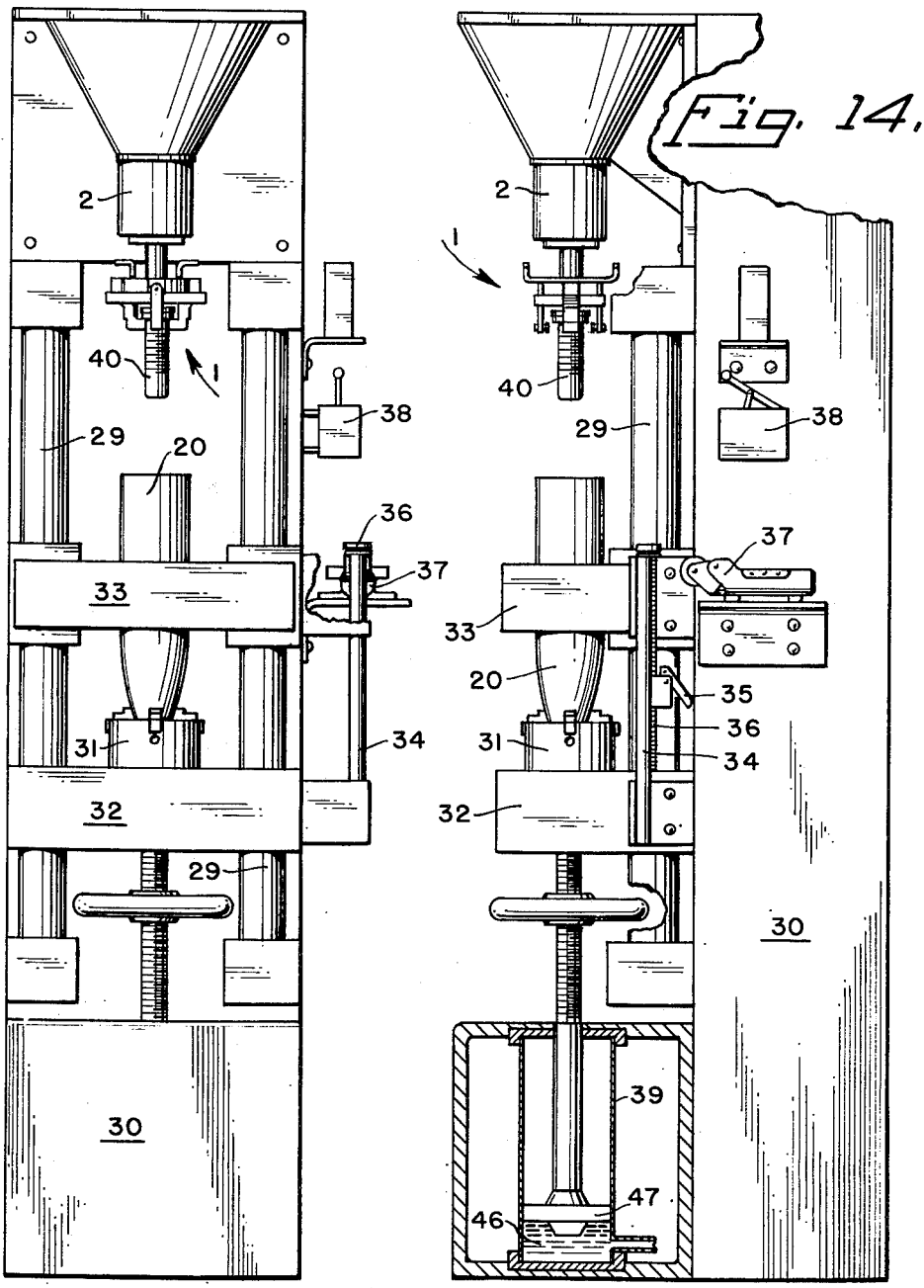

United States Patent Office 2,815,565
Patented Dec. 10, 1957

2,815,565

REMOTE CONTROL FUZE REMOVING DEVICE

E Melvin Johnson, Pinole, and Reese Tripp, Vallejo, Calif., assignors to the United States of America as represented by the Secretary of the Navy Application November 10, 1955, Serial No. 546,292

4 Claims. (Cl. 29—240)

(Granted under Title 35, U. S. Code (1952), sec. 266)

The invention described herein may be manufactured and used by or for the Government of the United States of America for governmental purposes without the payment of any royalties thereon or therefor.

The present invention relates to a defuzing machine for loaded ammunition and more particularly to a device for completely withdrawing the base detonating fuze from loaded projectiles by remote control.

The present invention is a device which may be used with existing defuzing machines, without extensive alterations, to make possible a safe and practical means of completely defuzing loaded ammunition by remote control. Disadvantages of old methods consisted mainly of a safety factor, that is the fuze removal was started by machine, but not entirely removed, and then it was necessary to remove the projectile from the machine so that the operation of removing the fuze could be completed with hand tools, thus endangering the operator through physical contact with loaded ammunition. At times it was impossible to completely pull the fuze from the projectile by approved hand tools because the fuze and powder adhered to each other. These disadvantages are overcome by the present invention.

An object of the invention, therefore, is to provide a device for completely removing the fuze from loaded ammunition.

Another object of the invention is to provide a remote control fuze removing device.

A further object is to provide a fuze removing device which has a very high degree of safety in its operation.

A still further object of the invention is to provide a fuze removing device which saves on man hours through the elimination of many operations.

Other objects and many of the attendant advantages of this invention will be readily appreciated as the same become better understood by reference to the following detailed description when considered in connection with the accompanying drawings wherein:

Fig. 13 is a front view of a defuzing machine showing the fuze puller arms holding a pulled fuze;

Fig. 14 is a side view of the defuzing machine partly in section to show an hydraulic cylinder for raising and lowering projectiles to be defuzed, and showing a projectile with the fuze pulled.

Figure 1:
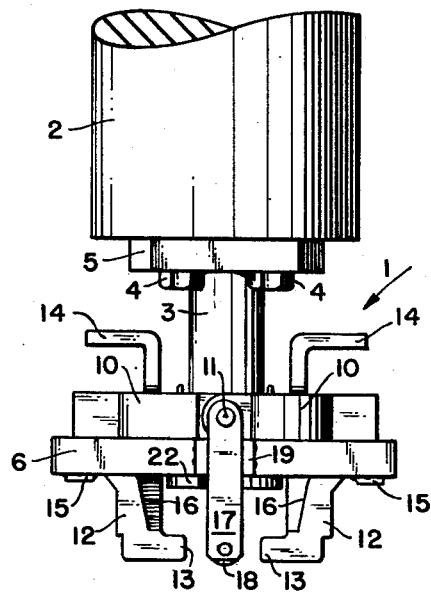
Fig. 1 is a front view of the fuze puller and wrench shaft assembly.
Figure 2:
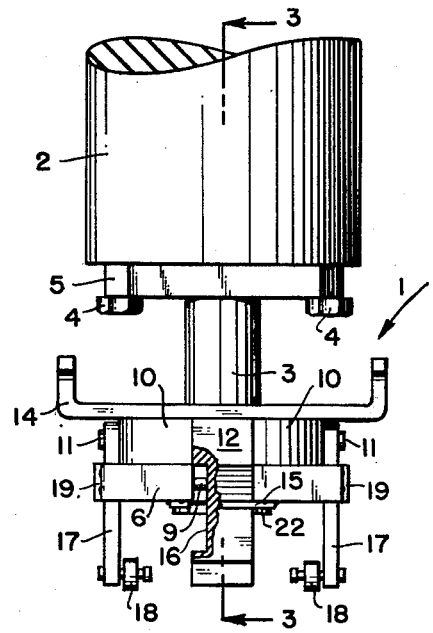
Fig. 2 is a side view of the fuze puller and wrench shaft assembly.
Figure 3:
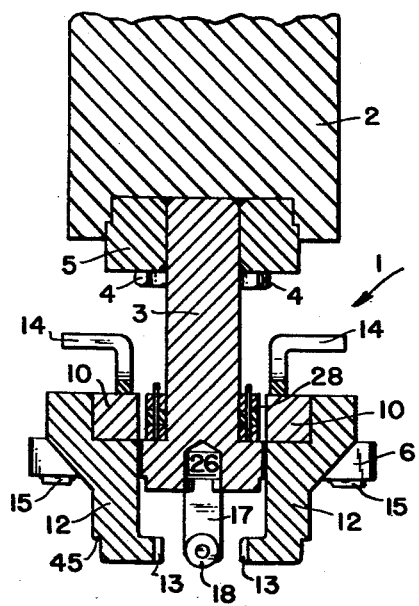
Fig. 3 is a sectional view of the fuze puller and wrench shaft assembly taken along the line 3—3 of Fig. 2.
Figure 8:
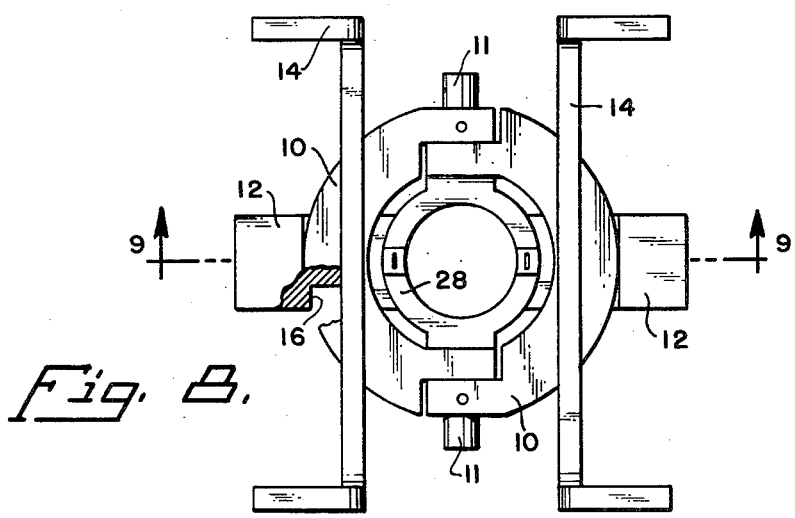
Fig. 8 is a top view of the fuze grasping mechanism.
Figure 9:
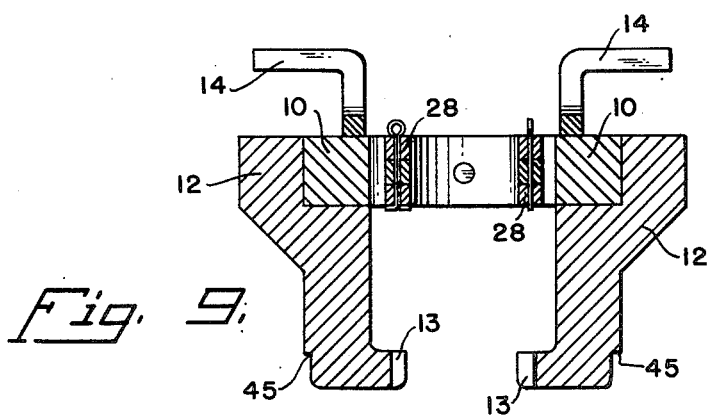
Fig. 9 is a sectional view of the fuze grasping mechanism taken along line 9—9 of Fig. 8.

Referring now to the drawings, like reference numerals refer to like parts throughout the figures. Figures 1, 2 and 3 show front, side and sectional views of the fuze puller assembly 1. The fuze puller assembly is mounted on a defuzing machine driving head 2 by means of screws 4 passing through a top flange 5 on the wrench shaft 3, see Figs. 4, 5, 6 and 7. The lower portion of wrench shaft 3 has a substantially flat rectangular plate 6 attached thereto. Plate 6 has small diametrically opposed slots 7 along each of the long sides thereof, and large diametrically opposed slots 8 along the narrow sides thereof. A pin 9 is mounted on one side of each of slots 8. The fuze grasping section, Figs. 8 and 9, of the puller assembly 1 consists of semi-circular hinge portions 10, which pivot on shafts 11 that are attached to a separable collar 28 which slidably fits about shaft 3. A fuze grasping arm 12 is fixedly attached to the outer and lower sides of each of the hinge portions 10. The lower portion of the fuze grasping arms 12 have a jutting lip 13 which contacts the fuze to be pulled. On the upper side of the hinge portions 10 are mounted handles 14 for raising the fuze grasping arms 12. The fuze grasping section of the puller assembly 1 rides about wrench shaft 3 and is supported by the rectangular plate 6 on the bottom of the shaft. The fuze grasping arms 12 fit in slots 8 so that they can move in and out as the arms are raised and lowered. Small rectangular metal strips 15 are mounted on the bottom of plate 6 across the slots 8 to limit the movement of grasping arms 12 and to permit the grasping arms to be locked in a raised position, see Fig. 10. Arms 12 have irregular shaped grooves 16 on one side thereof which are used to guide the movement of the arms by means of guide pins 9 on plate 6. Supports 17 having wheels 18 on the lower ends thereof are attached to the ends of the hinge pivoting shafts 11 and slidably fit in slot 7 on plate 6; metal strips 19 are mounted across slots 7 for keeping supports 17 within the slots. The supports 17 and wheels 18 hold the fuze gripping arms 12 away from the projectile 20; the wheels 18 ride on the projectile permitting the defuzing assembly 1 to rotate while preventing the arms 12 from scraping the surface of projectile as the fuze is being pulled.

Figure 11:
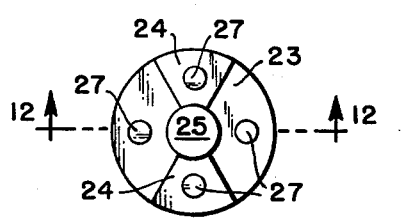
Fig. 11 is a top view of a fuze wrench.
Figure 12:
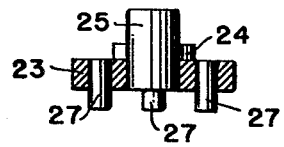
Fig. 12 is a sectional view of the fuze wrench taken along line 12—12 of Fig. 11.
Figure 4:
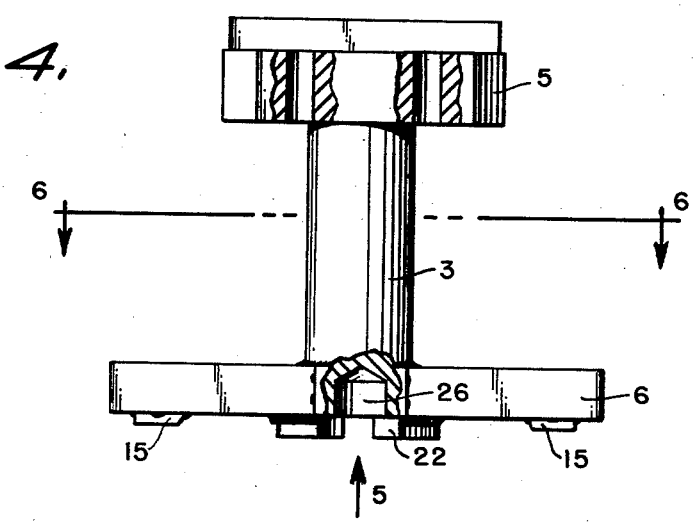
Fig. 4 is a front view of the wrench shaft assembly.
Figure 5:
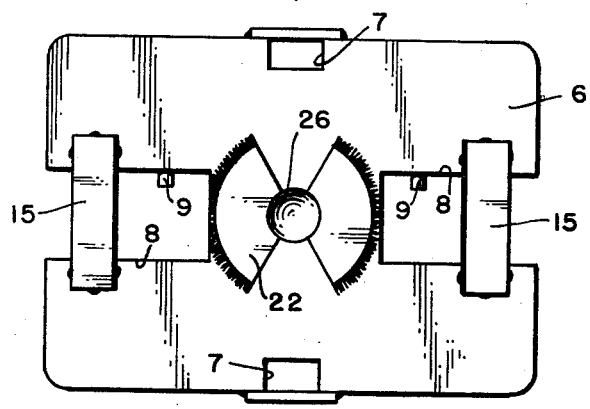
Fig. 5 is a bottom view of the wrench shaft assembly.
Figure 6:
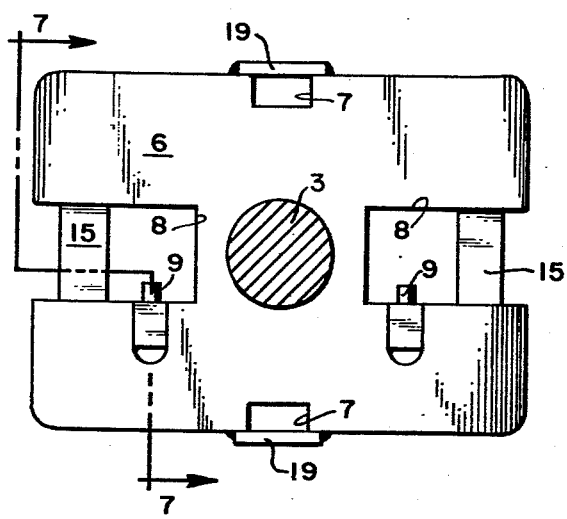
Fig. 6 is a view of the wrench shaft assembly taken along the line 6—6 of Fig. 4.
Figure 7:
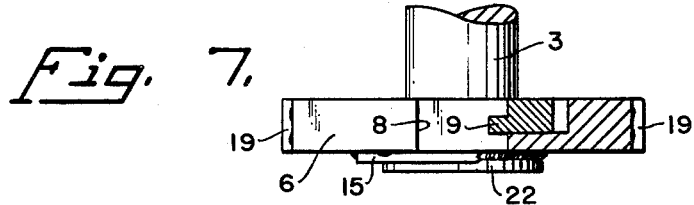
Fig. 7 is a view of the wrench shaft assembly taken along the line 7—7 of Fig. 6.
Figure 10:
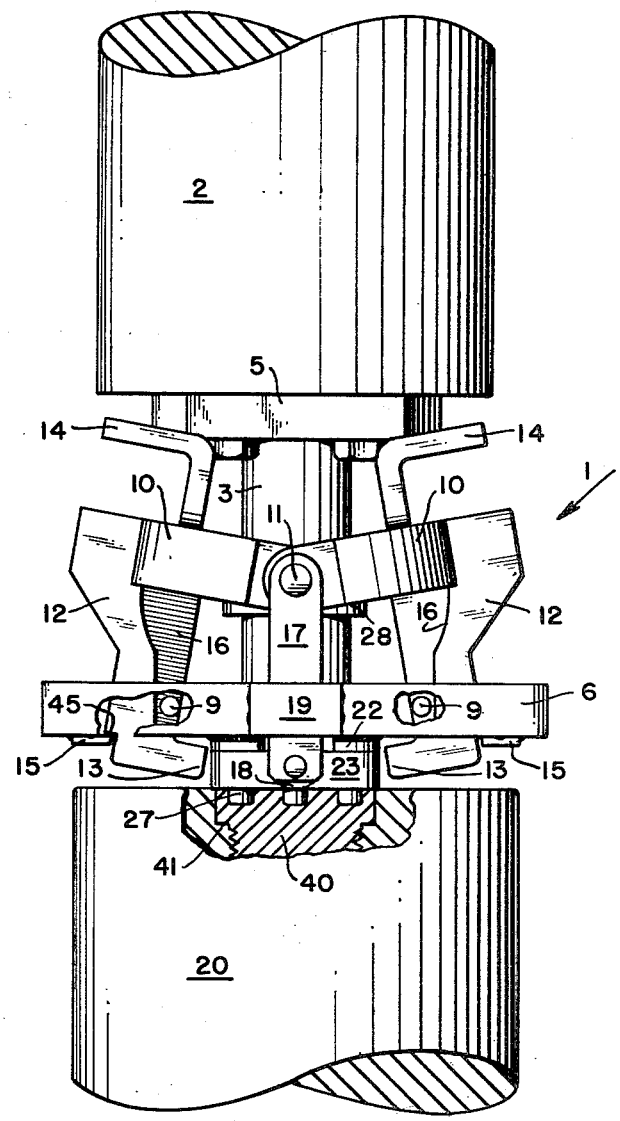
Fig. 10 is a front view showing the fuze pulling device with grasping arms raised and the wrench in contact with a projectile for removing a fuze.

The center of the bottom of the rectangular plate 6, Fig. 5, has a clutch type face 22 which engagingly fits a clutch type face 24 on the top of fuze wrench 23, Figs. 10 and 11. The wrench 23 has a centering pilot 25 for guiding into a hole 26 in the center of the bottom of plate 6. Drive pins 27 are mounted in the bottom of wrench 23 for fitting holes in the base of a fuze 40 as in Fig. 10.

The defuzing device 1 is mounted on the drive head 2 of a defuzing machine 30, as illustrated in Figs. 13 and 14. A projectile 20 is placed in the defuzing machine putting one end of the projectile in a chuck 31 on the lift 32 of the vise assembly. The chuck 31 is made to hold either the nose or base of a projectile. The projectile 20 is then clamped in the machine by means of clamp 33. The position of cam 35 on the position mechanism 34 which is attached to the traveling parts of the machine 32 and 33 that form the vise assembly and which travel along guide shafts 29, is adjustable by means of screw 36. The cam 35 is adjusted to operate a reversing valve 37 at a point when the fuze threads are fully disengaged from the projectile. This adjustment must be made each time there is a change in the length of the projectiles being defuzed. The defuzing machine is hydraulically operated in the preferred embodiment of the invention, but other well known modes of power could be used.

After the projectile 20 is clamped in the defuzing machine and cam 35 is adjusted on the position control mechanism 34 by screw 36 the operating sequence is as follows: The fuze pulling arms 12 are lifted to locking position by squeezing handles 14 toward each other while at the same time lifting them upwards; this brings notch 45 on the back of the grasping arms 12 to fit over the edge of the metal strips 15 and hold the grasping arms in a raised position, as illustrated in Fig. 10. A fuze wrench 23 is placed on a fuze 40 to be pulled so that the wrench pins 27 fit into the corresponding wrench pin holes in the base of the fuze. Then a control valve 38 is operated allowing hydraulic fluid 46 to flow into cylinder 39, Fig. 14, causing the piston 47 to rise lifting parts 31, 32, 33, 34, comprising the vise assembly of the machine and raising the projectile bringing the clutch face 24 of wrench 23 into contact with the clutch face 22 on the bottom of plate 6 of the wrench turning shaft 3, see Fig. 10; the end of the upward movement of the projectile will push supports 17 up slightly raising the grasping arm assembly sufficient to unlock the arms 12 from their raised position. The machine operator then leaves the barricaded cell where the defuzing machine 30 is located and starts the rotation of the drive head 2 of the machine by remote control. The initial rotation of the drive head engages the clutch faces 22 and 24 on the wrench shaft plate 6 and wrench 23. As the drive head 2 continues to turn, the fuze unscrews and pushes the projectile 20 down against a uniform hydraulic pressure. The grasping arms 12 of the fuze puller follows and closes under the flange 41 on the fuze 40 when the fuze has unscrewed sufficiently for the lips 13 of the grasping arms 12 to fit between the fuze flange 41 and the projectile 20. The drive head 2 continues to turn, unscrewing the fuze and bringing the cam 35 into contact with reversing valve 37 which is in a hydraulic circuit, not shown, that operates the raising and lowering of the projectile. The reversing valve 37, when actuated by cam 35, permits the pressure on cylinder 39 to gradually reduce, and then reverses, allowing the hydraulic fluid 46 to flow out of cylinder 39 causing the vise assembly to be lowered and resulting in the projectile being pulled away from the fuze and leaving the fuze in the fuze puller, see Figs. 13 and 14. The fuze is entirely removed from the projectile in one operation. The drive head 2 is stopped, then the operator returns to the cell and removes the fuze 40 and wrench 23 from the puller arms 12 by squeezing together the handles 14 at the top of the fuze puller assembly 1. The defuzed projectile can then be unclamped and removed from the machine.

Obviously, many modifications and variations of the present invention are possible in the light of the above teachings. It is therefore to be understood that within the scope of the appended claims the invention may be practiced otherwise than as specifically described.

What is claimed is:

1. A fuze removing device for loaded ammunition comprising a drive head capable of rotating, a fuze pulling assembly attached to said drive head, and a vise assembly which may be raised and lowered mounted beneath said drive head and fuze pulling assembly for holding ammunition to be defuzed; said fuze pulling assembly comprising a wrench driving shaft attached directly to the drive head, a flat plate having a clutch type face for engaging with a similar clutch type face on a fuze wrench, said flat plate fixedly mounted on the bottom of said wrench driving shaft, fuze grasping arms which slidably fit in slots on said flat plate and depend below the plate from a hinge arrangement which rides above said plate; whereby when a loaded projectile is clamped in said vise, a fuze wrench is fitted on the end of the fuze to be pulled and the projectile raised into contact with the fuze pulling assembly said clutch faces will engage when the drive head is rotated and cause the fuze to unscrew from the projectile; said fuze grasping arms close on the end of the fuse as the fuse is being unscrewed and firmly grip the end of said fuze when its threads are unscrewed from the projectile and when the vise holding the projectile is lowered the fuze is pulled from said projectile.

2. A device as in claim 1 wherein said fuze pulling assembly includes means to prevent said fuze grasping arms from scraping on the projectile.

3. A device as in claim 2 wherein the means to prevent said fuze grasping arms from scraping on the projectile comprises two downwardly depending supports whose upper ends are attached to said hinge arrangement and which slidably fit in small slots on the sides of said flat plate, said supports having small wheels on the lower ends thereof which ride on the fuze end of the projectile.

4. A device as in claim 1 wherein said fuze pulling assembly has handles mounted on the top side of said hinge arrangement for lifting said grasping arms and for locking said arms in a raised position.

References Cited in the file of this patent

UNITED STATES PATENTS

| | | |
|---|---|---|
| 1,507,654 | Allison | Sept. 9, 1924 |
| 1,508,494 | Allison | Sept. 16, 1924 |
| 1,900,017 | Kennedy | Mar. 7, 1933 |
| 2,300,435 | Ricciardi | Nov. 3, 1942 |
| 2,367,672 | Di Cosmo et al. | Jan. 23, 1945 |
| 2,678,576 | Thompson | May 18, 1954 |

FOREIGN PATENTS

| | | |
|---|---|---|
| 109,999 | Great Britain | Oct. 2, 1917 |